United States Patent [19]

Duncan et al.

[11] 4,212,443
[45] Jul. 15, 1980

[54] STRAPPED DOWN ATTITUDE AND HEADING REFERENCE SYSTEM FOR AIRCRAFT EMPLOYING SKEWED AXIS TWO-DEGREE-OF-FREEDOM RATE GYROS

[75] Inventors: Damon H. Duncan; Martin S. Klemes, both of Phoenix, Ariz.

[73] Assignee: Sperry Corporation, New York, N.Y.

[21] Appl. No.: 907,228

[22] Filed: May 18, 1978

[51] Int. Cl.$^2$ .............................................. G05D 1/10
[52] U.S. Cl. ..................................... 244/177; 33/321; 73/178 R; 73/504; 244/79; 244/165; 364/453
[58] Field of Search ................. 33/321, 322, 323, 366; 73/178 R, 504, 505, 516 LM; 74/5 F, 5.6 D, 5.34, 5.37, 5.47; 244/3.2, 3.21, 79, 165, 175–177; 318/648, 649, 651; 364/434, 453, 459

[56] References Cited

U.S. PATENT DOCUMENTS

| | | | |
|---|---|---|---|
| 3,463,909 | 8/1969 | Weiss | 73/178 R X |
| 3,483,746 | 12/1969 | Bers | 33/322 X |
| 3,489,004 | 1/1970 | Barnhill et al. | 364/434 X |
| 3,492,465 | 1/1970 | Buscher et al. | 364/453 |
| 3,790,766 | 2/1974 | Brown | 244/177 X |
| 4,106,094 | 8/1978 | Land | 244/175 X |
| 4,125,017 | 11/1978 | Dhuyvetter et al. | 73/178 R |

Primary Examiner—Reinhard J. Eisenzopf
Attorney, Agent, or Firm—Howard P. Terry

[57] ABSTRACT

A set of two two-degrees-of-freedom rate gyroscopes and three linear accelerometers are assembled in a single module adapted to be mounted within a single aircraft electronics control unit, the unit comprising a strapped-down attitude and heading reference system. The module base provides a common keyed support for the two pre-calibrated gyros and three accelerometers in intimate mechanical and thermal association. The two gyros are oriented in the base and the base oriented in the aircraft so that the spin axis of one gyro is oriented parallel to the aircraft Z axis and that of the other gyro parallel to the aircraft Y axis while the gyro pick-offs and torquers (input and output axes, respectively) are rotated or skewed forty-five degrees about the spin axes to positions such that the input and output axes lie along the slant heights of a forty-five degree half angle right circular cone, the axis of which lies along the aircraft X axis. Thus a single module provides greatly simplified rate sensing about the aircraft primary axes with correspondingly simplified fault detection of the rate sensors.

6 Claims, 8 Drawing Figures

STRAPPED DOWN ATTITUDE AND HEADING REFERENCE SYSTEM FOR AIRCRAFT EMPLOYING SKEWED AXIS TWO-DEGREE-OF-FREEDOM RATE GYROS

BACKGROUND OF THE INVENTION

1. Field of the Invention

The present invention relates to gyroscopic reference apparatus for navigable craft, such as an aircraft, and more particularly relates to an inertial measurement unit or module for a strapped down attitude and heading reference system and or navigation system for aircraft embodying a unique arrangement and orientation of the axes of two two-degrees-of-freedom gyroscopic rate sensors, so as to provide in one module a passive gyro system or in two modules a fail operational gyro system. The gyro orientations also greatly simplify the aircraft body rate equations as well as the parity or failure detection and isolation equations thereby minimizing computer requirements.

A single-degree-of-freedom (SDF) gyroscopic rate sensor is one in which a spinning mass is so mounted relative to a vehicle that it can detect vehicle rates about but one axis. A two-degree-of-freedom (TDF) gyroscopic rate sensor is one in which a spinning mass is so mounted relative to a vehicle that it can detect vehicle rates about two orthogonal axes. A typical two-degree-of-freedom gyroscopic rate sensor is disclosed in the present assignee's U.S. Pat. No. 3,529,477 issued to T. R. Quermann and in copending U.S. Application Ser. No. 818,486 entitled "Permanent Magnet Torquer for Free Rotor Flexure Suspended Gyroscopes", filed July 25, 1977 in the names of C. Buckley and J. Kiedrowski.

2. Description of the Prior Art

Vehicle inertial reference systems based on a plurality of SDF or TDF rate sensors strapped down to the vehicle structure for measuring vehicle rates of rotation about its coordinate axes in combination with acceleration and direction sensors and computer means for computing vehicle acceleration, rate and displacement relative to the earth's or some other, coordinate axes are well known in the art and have been extensively described and discussed in the literature. For example, such inertial systems have been used extensively in missile and space vehicles. However, their use in commercial aircraft have not heretofore been economically feasible and the more traditional gimbal isolated gyroscopes and gyro platforms have been employed to provide direct measures of aircraft attitude relative to earth axes. However, strapped down gyro systems are now becoming practical from a weight, reliability, maintainability and cost of ownership standpoint with the advent of small, high accuracy and relatively low cost two-axis rate sensors and small, lightweight yet powerful digital computers for performing the computations required for coordinate transformation, integration, gyro drift or "erection" computations and failure detection isolation and conversion computations.

Skewing the axes of rate sensors in order to reduce the number of gyros required to provide redundancy of the rate measures for fail operational or dual fail operational systems is a generally old technique familiar to those skilled in the art of strapped down systems and also described extensively in the literature. For example, in one prior art dual redundant skewing arrangement, six SDF rate sensors are oriented with their sensitive axes lying on the surfaces of a dodecahedron oriented in a predetermined relationship relative to the aircraft coordinate axes so that each gyro measures a known component of aircraft rate about its coordinate axes. This dodecahedron configuration while satisfying redundancy requirements has been found to be very costly and lacking in accuracy. Another known dual redundant arrangement designed for military aircraft is to distribute six separate SDF solid state rate sensors at various spaced locations in the aircraft and to orient them so that their sensitive axes lie on the surface of a cone with a one-half angle of 77 degrees. In this arrangement each rate sensor is physically large and are independently housed apart from the system electronics and computer in groups of one, two or three per package, the packages dispersed about the aircraft to minimize a total system failure due, for example, to battle damage. The sensor dimensions prohibited them from being packaged in a single housing and their rate sensing capability required the very large cone half angle. Furthermore, the rate measurement matrix is very complex and requires substantial computation time. In short, this single degree of freedom rate sensor/cone configuration is unsuitable for application in commercial aircraft. Still another dual fail operational arrangements have been proposed in the prior art; such as, orienting four TDF rate gyros so that their sensitive axes lie in adjacent planes of a semioctahedron. This octahedron orientation, like the dodecahedron orientation, is not as accurate as the conic configuration. Also, in this system one TDF gyro, two accelerometers and associated computer electronics are mounted in a single LRU (line replaceable unit) and the required four LRU's were in turn mounted in a specially designed aircraft rack in different orientations such as to orient the gyros' input axes as described; a complex mechanical arrangement in the rack interconnected the gyros of each LRU so as to simultaneously precisely orient the gyro units relative to one another and to the aircraft axes. All of these systems are very complex mechanically, electrically and mathematically and are very expensive and not readily adaptable to general aviation or commercial aircraft use.

For commercial airline applications, simplicity of hardware, installation and calibration and maintenance removal in terms of minimum LRU's reliability, and over-all cost effectiveness are key considerations and it is to these that the inertial measurement unit (IMU) of the present invention is primarily directed.

SUMMARY OF THE INVENTION

In general, reliabilty is achieved through simplified redundancy and efficient monitoring while simplicity of hardware is achieved through the use of a single inertial measurement unit or module having a minimum number of sensors and adapted for mounting within a single system LRU. The present invention embodies in a single unit a unique skewed axis arrangement of two two-degree-of-freedom rate gyros plus three accelerometers which together with magnetic heading and airspeed (or Doppler) references normally available on the aircraft provide measures of vehicle accelerations, rates and attitude for use in aircraft control, instrumentation, navigation and guidance. Furthermore, the skew of the rate gyro's sensitive axes is such that each LRU provides a fail passive gyro reference system.

The crucial element of a strapped down reference system is the rate sensing gyroscope. It must be small, lightweight and cost effective and yet be very accurate; for example, for normal commercial aircraft operations, it should exhibit a random drift rate substantially less than one-quarter degree an hour, have aircraft rate measurement capability of 70°/sec continuous and 100°/sec short term, over normal environmental temperature extremes of about −50° C. to +70° C. Furthermore, it must be rugged enough to withstand the shock and vibration of the strapped-down environment. Such a gyro is disclosed in the above-referenced Quermann patent. Two two-degree-of-freedom rate sensors properly oriented in the vehicle can sense vehicle rates about its three primary coordinate axes; roll, pitch, and yaw. However, in order to meet the fail passive or fail operational requirements for commercial transport aircraft, gyro redundancy configurations must be considered in the light of packaging efficiency with a minimum number of gyro units, minimum monitoring complexity and maximum cost and weight efficiency. In accordance with the present invention a cluster of two TDF gyros and three accelerometers comprise a single inertial measurement unit (IMU) adapted for inclusion with a digital computer in a single LRU to provide a fail passive strap down attitude and heading reference system (AHRS). The skew of the rate gyro sensitive or input axes in such that only two gyros are required to provide fail passive rate measures about the aircraft primary axes. Two such IMU's can therefore provide fail operational characteristics. In both of these relative orientations the individual inertial component assemblies may be part number interchangeable thereby simplifying maintainability and logistics and ultimate cost of ownership.

According to one configuration of the present invention, two TDF rate gyros are so oriented relative to the IMU support base and to the aircraft primary axes that their input axes lie on the surface of a forty-five degree half-angle cone, the axis of which lies on the aircraft longitudinal or roll axis and the plane defined by the input axes of each gyro lies in the lateral and vertical planes of the aircraft; that is, the spin axis of each gyro are at right angles to each other and lie parallel to the aircraft vertical (yaw) and lateral (pitch) axis, respectively. With this orientation of the single IMU, each gyro is subjected to equal components of roll rate and hence provides in normal operation identical measures of such roll rate components, while the difference between the rate measures of one gyro is proportional to craft yaw rate while the difference between the rate measures of the other gyro is proportional to craft pitch rate. This configuration results in a very simple rate measurement matrix from which roll, pitch and yaw vehicle rates may readily be determined and more importantly results in a greatly simplified parity or fault detection equation. In other optional configurations, the axis of the cone may be oriented so as to lie along the aircraft lateral or pitch axis or along the aircraft vertical or yaw axis, the latter orientation greatly improving the aircraft yaw damper system redundancy and improving heading accuracy by averaging the two gyros yaw motion response; the measurement and parity equation simplicity remains.

BRIEF DESCRIPTION OF THE DRAWINGS

FIG. 2A is a view illustrating alternate orientation of the "sensing" cone relative to the aircraft axes;

FIG. 5 is a schematic illustration of a wide linear range accelerometer of the liquid level type;

DESCRIPTION OF THE PREFERRED EMBODIMENTS

Figure 1:
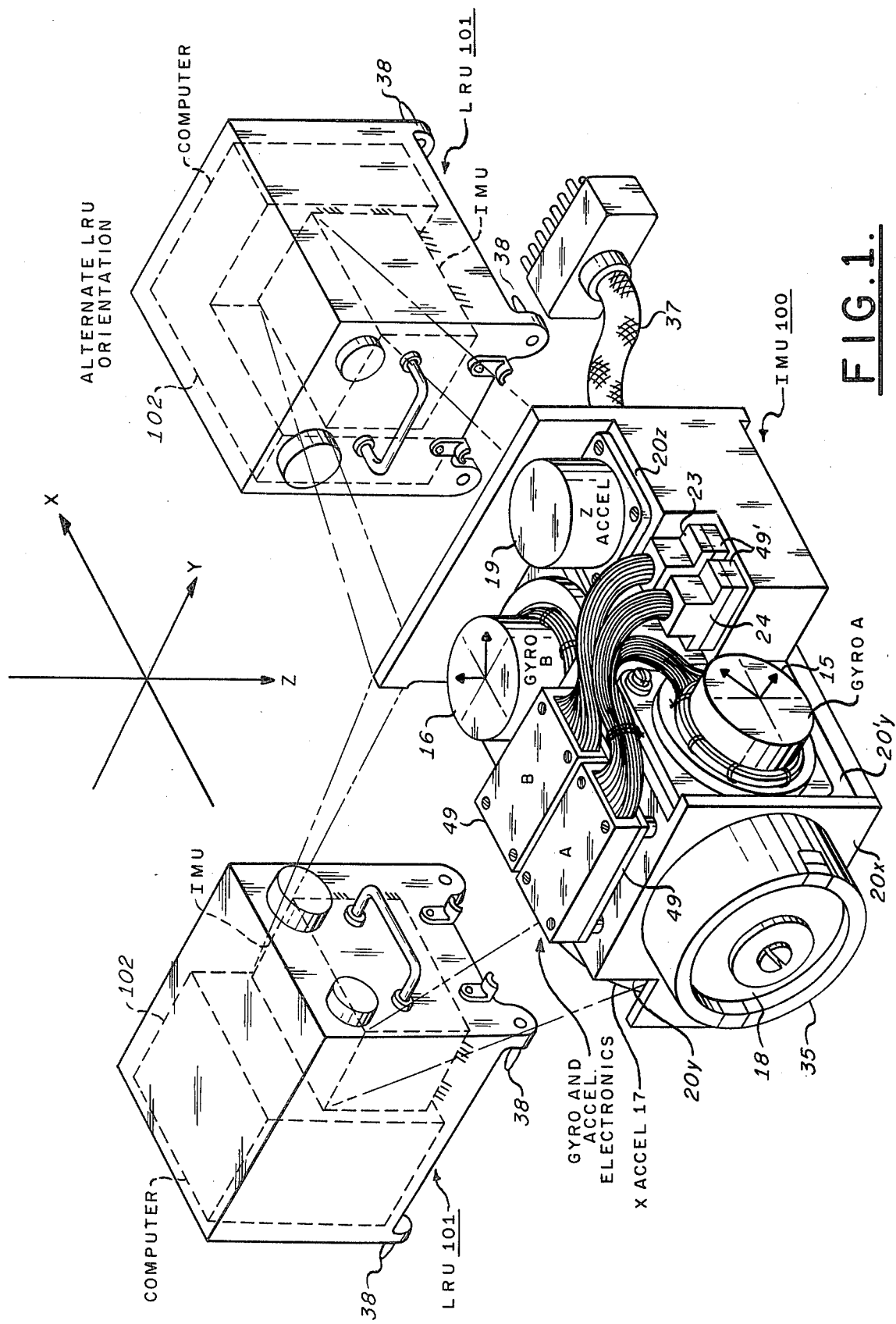
FIG. 1 is a pictorial illustration of the single IMU package and schematically shows how such a package may be installed in a single LRU for two optional orientations of the latter relative to the aircraft primary axes.

Referring first to FIG. 1, the inertial measurement unit or IMU 100 of the present invention is pictorially illustrated in its preferred orientation relative to the aircraft primary rotation axes X, Y and Z. Also pictorially illustrated is the complete strapped down attitude and heading reference system which comprises the IMU and digital computer packaged in a rigid, non-distortable, chassis or line replaceable unit (LRU) 101 designed to maintain the precision alignment of the IMU reference axes with the aircraft axes. Two alternative orientations of the IMU within the LRU are illustrated to accommodate a fore-aft or athwartship installation of the LRU in the aircraft; the compact IMU base support for prealigning the inertial elements permitting this orientation versatility. Furthermore, it may be desired to orient the base support member within the system chassis so that the axis of the cone defined by the gyro sensitive axes lie along the craft pitch axis or yaw axis instead of the roll axis, as illustrated in FIG. 2A. The compact IMU design readily permits either of these orientations.

Figure 3:
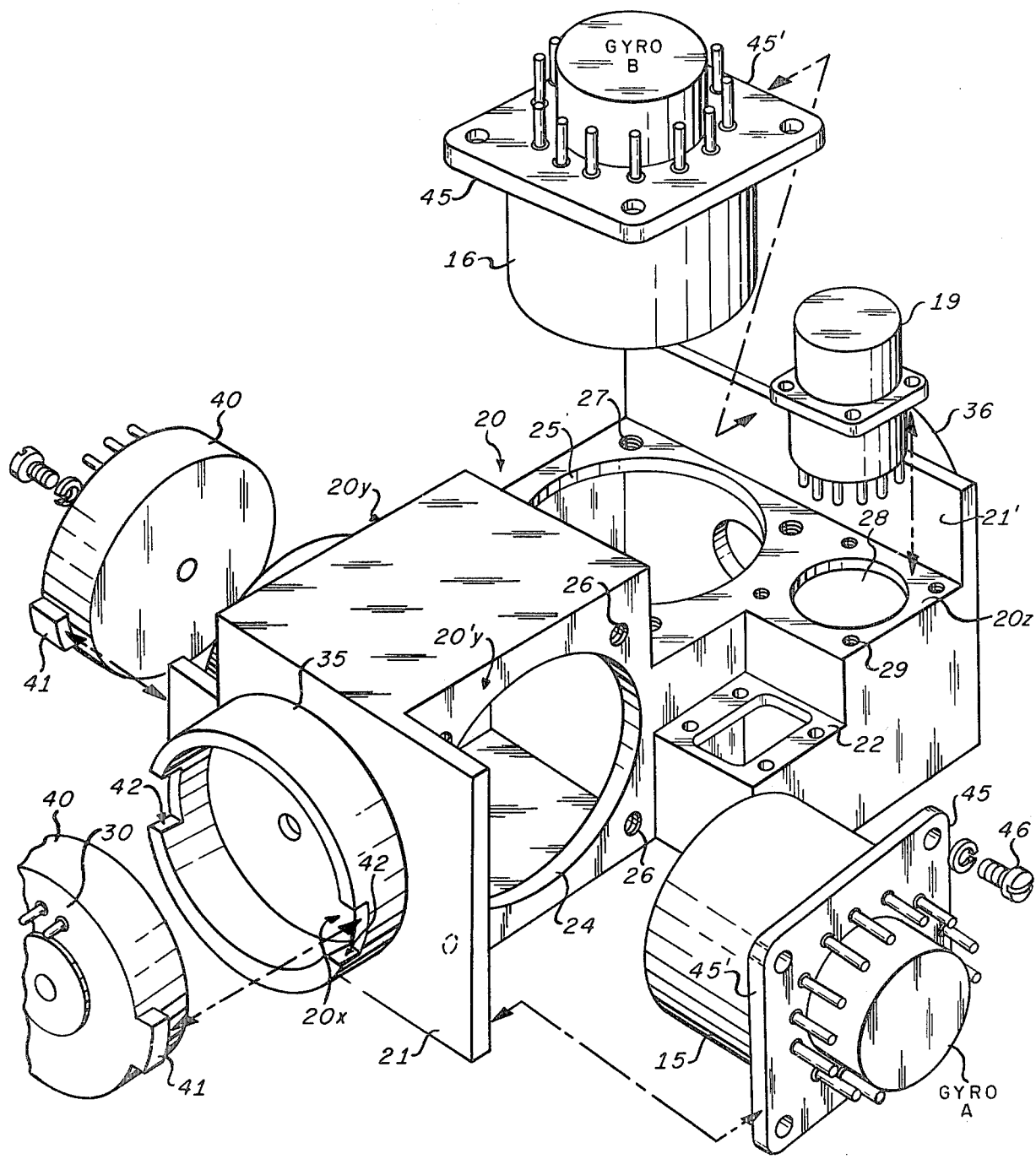
FIG. 3 is an exploded view of the IMU package illustrating keying techniques used for the precalibrated sensors
Figure 4:
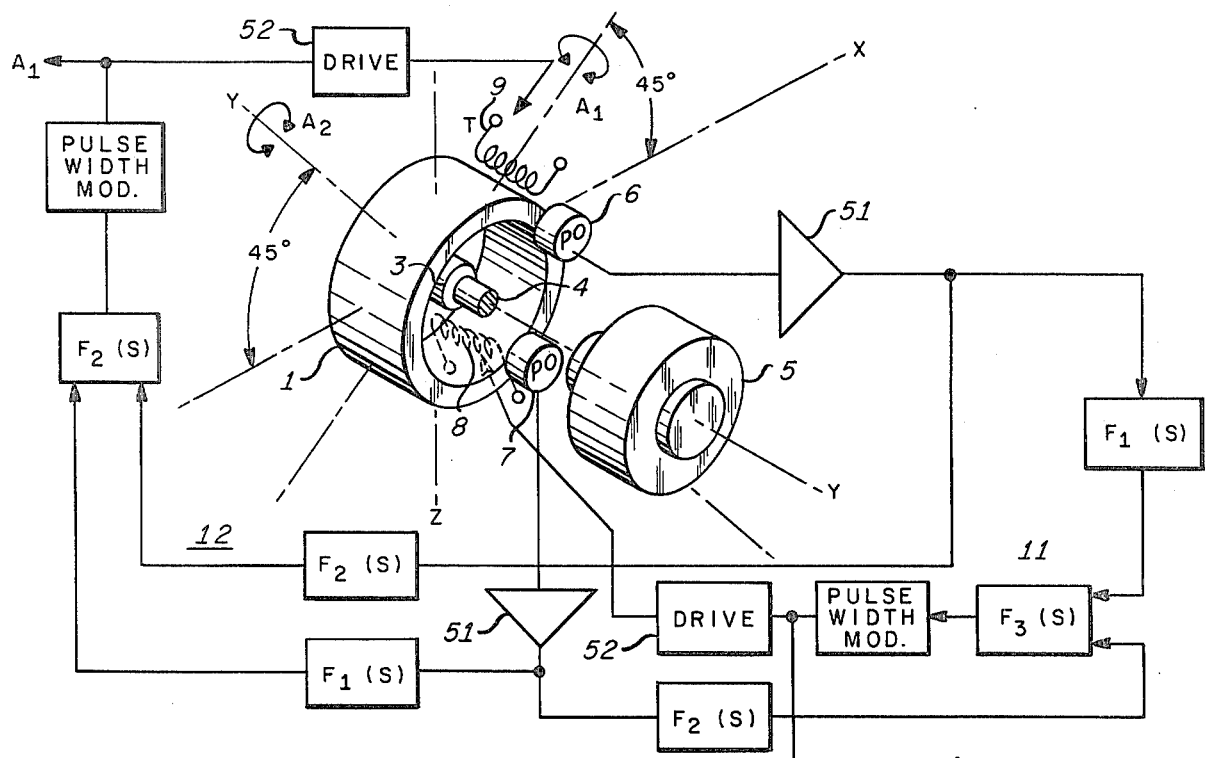
FIG. 4 is a schematic illustration of a typical two-degree-of-freedom rate gyro with its input axes lying in the aircraft X, Z plane but skewed 45° about the aircraft Y-axis.

Referring now to FIG. 4, there is here illustrated schematically the basic elements of a two-degree-of-freedom rate gyro, the detailed design of which is disclosed in the above Quermann patent. The orientation of the various axes of the gyro of FIG. 4 correspond to Gyro A of FIGS. 1, 2 and 3. Basically, each gyro of the present invention is part number identical with the other. Each gyro comprises a rotor 1 supported at the end of a drive shaft 2 by means of a flexure suspension 3 which is designated to provide a substantially frictionless, unrestrained universal angular deflection or tilting of the rotor relative to the spin axis 4 in response to aircraft motion and independent of rotor angular speed. The drive shaft is an extension of the rotor of a drive motor 5 fixed relative to the aircraft which spins the rotor to provide gyroscopic characteristics thereto. In accordance with these known characteristics, if the spinning rotor is subjected to a rotation of its case, i.e., its support, about an axis at right angles to the spin axis, the rotor will tend to maintain its position and hence detect such rotation. Since the rotor is universally tiltable relative to the spin axis, the rotor can detect rotations about two input axes at right angles to each other, both orthogonal to the spin axis. In the strapped down gyros of the present invention, the gyro rotor is prevented from actually being displaced from its zero position by applying equal and opposite restoring torques on the gyro about axes at right angles to the input rotation axes and hence cause the gyro to precess in a manner to reduce the original deflection to zero. Thus the gyro becomes a rate sensor, the torquer current being a measure of such rate.

As schematically illustrated in FIG. 4, gyro deflection in response to input aircraft rotations about its X and Z axis are detected by pickoffs 6 and 7 located at the rotor periphery and ninety degrees apart. Torque motors 8 and 9 are similarly located for applying the restoring torques. All of the foregoing gyro elements are contained in a suitable housing (not shown in FIG. 4) which is adapted to be secured directly to the aircraft as will be described further below. Each pickoff 6 and 7 supplies an electrical signal proportional to rotor deflection in response to aircraft rotations about a corresponding axis, which signal is amplified and applied to high gain, high bandwidth restoring or caging loops 11 and 12 to supply a precision current to the corresponding torquers 8 and 9 to apply a torque to the rotor in direction and magnitude required to maintain the pickoff signal substantially null. Thus, the magnitude and sense of the current required to do this is directly proportional to the magnitude and sense of the aircraft rotation rates. In practice two pickoffs and two torquers are provided for each axis and connected in series in a conventional fashion. Since each of the caging loops 11 and 12 is required to be a high gain loop to provide the desired response to the aircraft's rate characteristic, they likewise have a wide bandwidth. This tends to excite the gyro's inherent highly underdamped nutation mode. In order to stabilize each of the caging loops, direct and cross-axis pickoff signals are combined and shaped via time function networks. For example, the torquer 9 is excited with a current derived from direct pickoff 7 through a lead circuit $F_1(S)$ to provide a rate of change effect to the torquer 9, from pickoff 6 through a high gain integrator $F_2(S)$ to assure no zero frequency standoff and from a combining circuit for the above signal components having a band pass characteristic $F_3(S)$ to provide the desired phase/gain characteristic. In one embodiment the gyro rebalance or caging loop has a phase margin of 44 degrees and a gain margin of 14 DB. The precision torquer current is derived using a pulse width modulation technique which may be of the character set forth in copending application Ser. No. 939,306, filed on Sept. 5, 1978 in the name of A. R. Allen and also assigned to the present assignee. Alternatively, the voltage producing the precision torquer current may be converted to a frequency which in turn may be converted to a digital count as taught in copending application Ser. No. 847,861, filed Nov. 2, 1977 in the name of J. Johnson and assigned to the present assignee.

Since the angular position of the pickoffs and torquers about the rotor periphery respond to and cancel rotor deflections at these angular points, it will be appreciated that if these locations do not coincide with the axis about which the aircraft rotates, i.e., its primary coil, pitch and yaw coordinate axes, each pickoff and torquer will respond to and cancel those orthogonal components of aircraft angular rates corresponding to the angular position thereof about the rotor periphery. Since the rate gyro housing is mounted on the aircraft so that the position of the pickoffs/torquers are displaced 45° from the aircraft primary axes to which the rotor responds, the resulting signals from the gyro will be proportional to 45° components of the actual aircraft rates about these axes. This situation is illustrated schematically in FIG. 4. The plane of the rotor and its spin axis orientation relative to the aircraft roll (X), pitch (Y) and yaw (Z) axes render the rotor responsive to aircraft rates of rotation about the X and Z axes. The gyro housing is so mounted in its support base and the base is so strapped to the aircraft that its pickoffs/torquers are angular displaced about the spin axis so that they are 45° displaced from these aircraft axes. Therefore, each of the pickoffs respond to components of aircraft rotations about the X and Y axes and the torquers likewise null only these components. Another way of describing this pickoff/torquer orientation is that the two-degree-of-freedom gyro of FIG. 3 is strapped to the aircraft such that its input axes are displaced 45° relative to the aircraft X and Z axes; that is, its input axes are the axis $A_1$ and the axis $A_2$ of FIG. 4. Thus, the gyro responds in a mathematically predetermined manner to aircraft rates about its X and Z axes as will be described further below.

In the IMU of the present invention, liquid level type of accelerometers are used to measure aircraft acceleration along the lateral and longitudinal (pitch and roll) axes of the aircraft which measures are used to compute the vertical and provide inertial velocity information for the erection system. A conventional force-feedback accelerometer is used to measure vertical (yaw) axis accelerations. The former accelerometers may be of the precision type disclosed in U.S. Pat. No. 4,028,815 issued to Buckley et al, and assigned to the same assignee as the present invention. A schematic illustration of such an accelerometer is illustrated in FIG. 5. The basic configuration comprises a torous 30 of a non-conductive material, such as a ceramic, the internal toroidal cavity being half-filled with a conductive electrolyte solution. Oppositely facing electrode pairs 31, 32 are arranged to form conductance cells between the immersed electrode pairs. The electrodes are connected in a Wheatstone-bridge type of circuit to provide an output from amplifier 33 proportional to tilt angle. As disclosed in detail in the Buckley et al patent, a third electrode 34, located in the torous so as to always remain immersed in the electrolyte, is provided. This electrode is used to measure electrolyte conductance changes due to temperature effects and are connected in feedback fashion around amplifier 33 to provide scale factor compensation. Thus, the accelerometer of FIG. 4 is sensitive to angular tilt about its axis of symmetry as well as linear accelerations along axes coplanar with the plane of the torous and at right angles to said symmetry axis.

From the above discussion of the two-degree-of-freedom force rebalanced rate gyro of FIG. 4 and the compensated toroidal accelerometer of FIG. 5, the orientation of these inertial components in the IMU cluster in accordance with the invention will now be discussed, reference being made to FIGS. 1, 2 and 3. In FIG. 1 there is illustrated a mechanical pictorial representation of the single inertial measurement unit (IMU) or module of a strapped down attitude and heading reference system (SDAHRS). It should be pointed out here that while the IMU of the present invention will be described herein in connection with a SDAHRS, it will be appreciated that the principles involved are also applicable to a strapped down inertial navigation system (SDINS) depending upon the measurement precision capability of the inertial sensors and the capability of the associated digital computer.

Briefly, a SDAHRS comprises strapped down rate sensors for measuring aircraft rates about its primary axes together with acceleration sensors for providing a long term attitude (roll and pitch) reference and for providing inertial velocity component for the erection system. Auxiliary inputs are from a long term heading reference such as a magnetic azimuth detector or flux valve 80 (FIG. 7) and a craft velocity input such as from an air data computer or doppler radar 81 (FIG. 7) for use in the erection system. A computer 102, preferably a digital computer, for solving the erection and attitude equations and auxiliary computations completes the system. Essentially, the rate sensors sense aircraft body axes rates directly, which may be used through suitable summing and scaling networks for automatic aircraft stabilization purposes, which rates are also integrated and direction cosine transformed in the digital computer to provide aircraft roll, pitch and heading attitude as will be briefly described below. The accelerometers sense aircraft accelerations along its primary axes, which are used for short term aircraft stabilization and maneuver coordination purposes, but which together with aircraft airspeed or Doppler velocity are used primarily to provide a long term vertical reference through a computer solution of a second or third order erection loop to compensate for any drifts or other long term disturbances of the rate gyros. The flux valve provides a long term heading reference in the magnetic heading or gyromagnetic heading modes of operation of the system.

Figure 2:
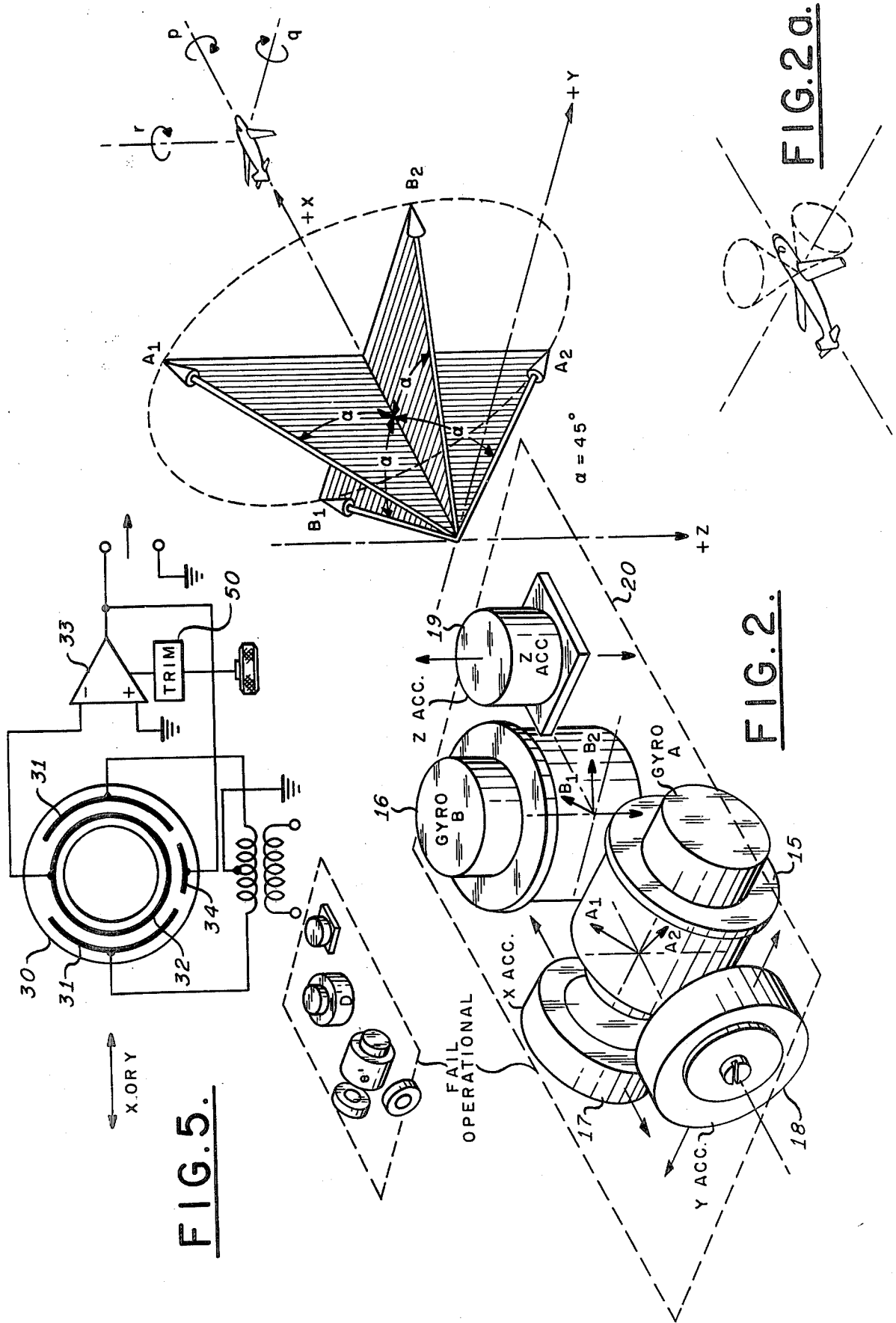
FIG. 2 is a similar pictorial schematic illustration of the orientation of the two TDF gyros and three accelerometers which comprise one IMU of FIG. 1 together with a diagram of the conical orientation of each gyro's input axes relative to the aircraft longitudinal (roll) axis X, lateral (pitch) axis Y and vertical (yaw) axis Z; it also includes a schematic illustration of the orientation of a second IMU arranged for fail operational capability.

FIG. 2 schematically illustrates only the active elements of the IMU of FIG. 1 and their orientation relative to the aircraft axes. These comprise the two identical TDF gyros 15 (Gyro A) and 16 (Gyro B), the two wide range toroidal accelerometers 17 and 18 and the one vertical accelerometer 19. All of these inertial elements are secured, with the relative positions and orientations illustrated, on a base support member 20 shown in general in FIG. 1 and illustrated in detail in FIG. 3. In accordance with the teachings of the present invention, the IMU surfaces $20_y$ and $20_z$ are mutually orthogonal and normal to the aircraft Y and Z axes respectively; each of the gyros 15 and 16 are mounted on these surfaces with their spin axes parallel to the aircraft Y and Z axis and their input axes, illustrated schematically by vectors $A_1$, $A_2$ and $B_1$, $B_2$ in FIG. 2, lying on (or are parallel with) the surface of a right circular 45° half angle cone 25, the axis C of which lies along (or is parallel to) the aircraft roll or X axis. Gyro A input axes $A_1$ and $A_2$ lie in a first vertical section of the cone 25, the plane defined by it being in (or parallel with) the aircraft vertical plane defined by its X, Z axis as shown in connection with FIG. 3, and the gyro B input axes $B_1$ and $B_2$ lie in a second vertical section of the cone, the plane of which being in (or parallel with) the aircraft horizontal plane defined by its X, Y axes. This conic input axes orientation of gyros A and B is illustrated schematically in the center of FIG. 2 while their orientations with respect to the aircraft roll, pitch and yaw axes about which aircraft roll rate p, pitch rate q and yaw rate z are measured, is illustrated to the right of FIG. 2.

Referring now to FIGS. 1 and 3, particularly the latter, the base support member 20, comprises an aluminum casting which has been precision machined into the shape illustrated so as to mount the inertial elements in a manner such that the resulting IMU assembly conforms generally to a compact rectangular block on the order of 6×4×3 inches preferably with none of the inertial elements extending beyond these dimensions so that they and their electrical assembly connections are protected during handling and in use. A suitable cover may be provided but is not necessary since each of the sensors are hermetically sealed and the entire IMU is wholly contained within a closed system chassis.

Since the long term reference for the system is the acceleration measurement, the accelerometer mounting surfaces are made the primary surfaces to which the other surfaces are referenced. Therefore, the X axis and Y axis accelerometer surfaces 20X and 20Y are precision machined so that they are perpendicular to each other and the Z axis accelerometer surface 20Z is machined to be precisely perpendicular to the X, Y reference surfaces. These surfaces 20X, 20Y and 20Z may be said to be horizontally facing, laterally facing, and vertically facing surfaces respectively, i.e., perpendicular to the X, Y and Z axes of the aircraft. The keyways 42 are machined parallel to surface 20Z to provide precision angular alignment of the accelerometers 30. The base casting 20 is formed with an indented surface 20'Y leaving a laterally extending side wall 21; the surface 20'Y being precision ground to be parallel with Y axis accelerometer surface 20Y, while the internal surface wall 21 joining surface 20'Y is precision machined to be precisely parallel to surface 20X whereby to form an aligning track-like surface for A gyro 15 when assembled, as will be further described. Similarly, the casting 20 is formed with the indented surface 20Z leaving a vertically extending side wall 21'; the surface 20Z being precision ground to be perpendicular to the surfaces 20X and 20Y. The internal surface of wall 21 is machined to form an aligning or track-like surface for B gyro 16 when assembled as will be described. The vertically and laterally indented surface 22 of the casting 20 serve as a mounting surface for the electrical connectors shown at 23 in FIG. 1. In the lateral facing surface 20'Y and in the vertical facing surface 20Z, large holes 24, 25 are drilled to accommodate the housings of the A and B gyros respectively whereby when assembled the spin axes of A gyro 15 is parallel to the craft Y axis and the spin axis of B gyro 16 is parallel to the craft Z axis. The diameters of the holes are slightly larger than the diameters of the gyros' housings for reasons to be explained. Also, mounting holes 26, 27 are drilled and tapped in these walls for securing the gyros thereto as by screws 46. A further hole 28 is drilled in the vertical facing surface 20Z to accommodate the vertical accelerometer 19 together with tapped fastening holes 29.

The casting 20 further includes cylindrical housings 35, 36 extending from the end surfaces thereof. One of these housings 35 encloses the lateral accelerometer 18 while the other encloses the exit opening for the IMU electrical cable connection 37 (FIG. 1). The cylindrical outer surface of these extensions 30, 31 provide a means for securing the entire IMU into a mounting frame (not shown) which includes suitable vibration isolators for providing protection of the IMU from excessive shock and vibration. The IMU is precisely aligned in the mounting frame and the frame aligned with the same precision on reference surfaces within the LRU so that the IMU may be removed and replaced without time consuming realignment procedures. The latter is further precisely aligned with the aircraft through aligning pins 38 (FIG. 1) which mate with corresponding holes in the aircraft support tray which is of course precision aligned with the aircraft reference axes.

As already mentioned, it is imperative that the gyro pickoffs and torquers and the accelerometer sensitive axes be aligned precisely relative to the IMU and ultimately to the aircraft X, Y and Z axes. In accordance with the present invention, all of the inertial components, the accelerometers 17, 18 and 19 and the A and B gyros 15 and 16, are all accurately precalibrated components; that is, the sensing elements of each component is precisely aligned with their supporting housing structure. This feature greatly simplifies repairs and overhaul since defective sensors may be easily and rapidly replaced with precalibrated spares without having to recalibrate the entire IMU thereby greatly decreasing the ultimate cost of ownership of the system. Each accelerometer torous 30 is calibrated and aligned within a support housing 40 so that with the aligning keys 41 precisely horizontal, the electrical output of the static accelerometer will be zero. Thus, when the support housing 40 is assembled within the IMU cylinder 35, as by suitable screw attachment, the keys 41 will mate with the precisely horizontal keyways 42.

Similarly, each gyro includes a rectangular reference flange 45 and the input and output axes of each gyro; e.g., $A_1$ and $A_2$ of FIG. 4, are precisely aligned to lie in the plane of the flange 45 and at 45° relative to a reference surface 45' of the flange within the electronic calibration limits of the gyro. The flange lateral dimensions and holes 24 and 25 diameters are such that in assembling the gyros in the base member 20 the reference flange surface 45' may be urged against and thereby aligned with the precision reference internal surfaces of the housing formed by the rail-like extensions 21 and 21'. The flange mounting holes may be of slightly larger diameter than the mounting screws 46 to enable the flange surfaces 45' to be abutted against the wall 21, 21' surfaces.

In order to compensate for any slight misalignments between the accelerometers and the housing an electronic accelerometer null trim adjacent 50 (FIG. 5) may be provided. No matter how carefully each gyro and its associated electronics are manufactured, each gyro will have its own individual characteristics determined by test procedures; for example, the null sensitivities of the pick-offs and torquers, the scale factors of the pick-offs and torquers, its g-sensitivity, pick-off bridge balance, etc. Thus, each gyro includes a preassembled electronic printed circuit card, cable harness and plug assembly 49 (FIG. 1) connected with the gyro. The electronic card includes for example the pick-off buffer amplifiers 51, torquer drivers 52 (FIG. 4) and a PROM which has been "blown" in accordance with the other characteristics peculiar to its associated gyro. The electronic cards are fastened to the top surface of the base support 20 and the plugs 23, 24 are inserted into corresponding receptacles 49' which connect with the IMU connector cable and plug assembly 37 as shown in FIG. 1. Thus, in service, if a gyro is found to be faulty, it and its associated card, harness and plug assembly may easily be removed and a spare precalibrated gyro and card assembly may be installed without the necessity of recalibrating the entire IMU.

The IMU configuration described above provides maximum performance and failure detection capability with minimum number of components all assembled in a compact housing structure. The 45° conic orientation of the gyro input axes provides high sensitivity to aircraft motions about all of its axes and involves all of the gyro axes and all gyro electronics in built-in fault detection (BITE) tests. Maximum sensitivity performance consistent with simplified and sensitive monitoring is obtained because the sum of the rates sensed by all of the gyros is 71% of aircraft roll rate while the difference between the rates sensed by A gyro 15 is 71% of aircraft yaw rate and the difference between the rates sensed by B gyro 16 is 71% of aircraft pitch rate. Furthermore, the 45° conic orientation of the gyro input axes involves 71% of all of the aircraft input rates and all gyro electronics in the detection of faults thereby providing highly sensitive monitoring with minimum nuisance warnings. Since the sum of the rates sensed by both gyros is proportional to roll rate, both sums must be equal; if they fail to match a fault exists someplace between the gyros and their comparison point, i.e., in the computer.

The A and B gyro outputs may thus be expressed by the following matrix:

$$\begin{bmatrix} A_1 \\ A_2 \\ B_1 \\ B_2 \end{bmatrix} = \begin{bmatrix} \cos 45° & 0 & -\sin 45° \\ \cos 45° & 0 & \sin 45° \\ \cos 45° & -\sin 45° & 0 \\ \cos 45° & \sin 45° & 0 \end{bmatrix} \times \begin{bmatrix} p \\ q \\ r \end{bmatrix} \quad (1)$$

where
 p = craft rotation rate about its roll axis
 q = craft rotation about its pitch axis
 r = craft rotation about its yaw rate From this matrix the following aircraft body rate equations may be derived.

$$p = \frac{A_1 + A_2}{1.41} = \frac{B_1 + B_2}{1.41} \quad (2)$$

$$q = \frac{B_2 - B_1}{1.41} \quad (3)$$

$$r = \frac{A_2 - A_1}{1.41} \quad (4)$$

where $1.41 = 2 \cos 45°$

Since the sum of both outputs of gyro Z must equal the sum of both outputs of gyro B during proper operation of the IMU, viz.

$$A_1 + A_2 = 2p \cos 45° = B_1 + B_2$$

The failure detection equation is simply $$(A_1 + A_2) - (B_1 + B_2) \geqq F \quad (5)$$

where F is a predetermined constant related to $2p \cos 45°$.

Figure 6:
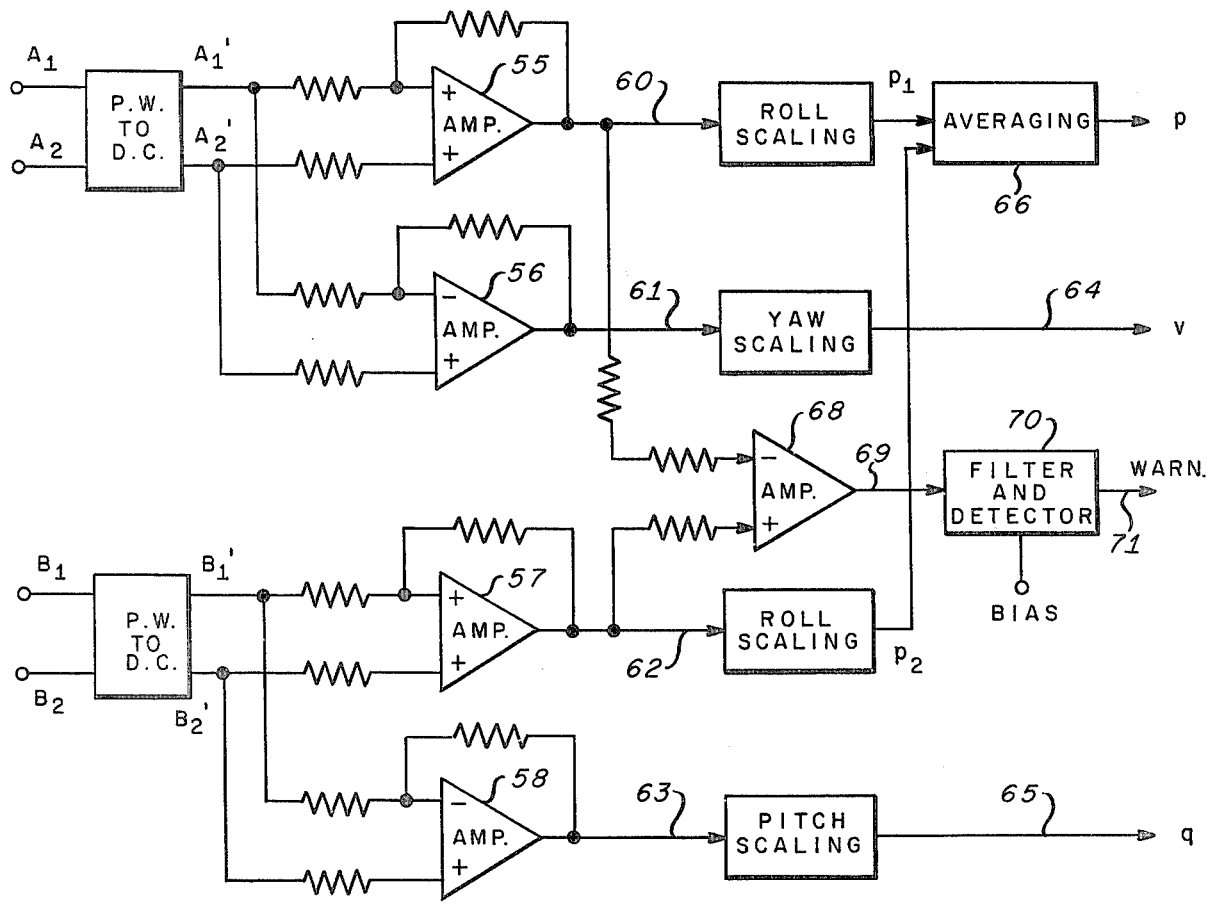
FIG. 6 is a simplified schematic of one embodiment of electronic apparatus responsive to the outputs of the gyros of one IMU for providing the rate measurement and failure monitoring functions.

In FIG. 6 there is illustrated an analog block diagram of apparatus for providing signals proportional to the body-axis rates p, q and r from the skewed axes gyros A and B. The pulse-width torquer input signals $A_1$ and $A_2$ from gyro A and $B_1$ and $B_2$ from gyro B are converted to proportional DC signals and applied as corresponding inputs $A_1'$, $A_2'$, $B_1'$, $B_2'$ to operational amplifiers 55, 56 and 57, 58, respectively. Gyro A inputs $A_1'$ and $A_2'$ are applied to amplifier 55 such that their signals are added, as indicated while they are applied to amplifier 56 such that their signals are subtracted. Thus the signal outputs, 60, 61 of amplifiers 55 and 56 are proportional to the quantities $(A_1+A_2)/1.41$ and $(A_2-A_1)/1.41$ respectively. Similarly, the gyro B inputs $B_1'$ and $B_2'$ are applied to amplifiers 57 and 58 such that their signal outputs 62, 63 are proportional to $(B_1+B_2)/1.41$ and $(B_2-B_1)/1.41$ respectively. Thus, after proper scaling as required by the above relationships, the output signal on lead 64 is proportional to craft yaw rate r and the output signal in lead 65 is proportional to craft pitch rate q. Since the signals on leads 60 and 62 are redundant measures craft roll rate p in accordance with equation (2) above, these two signals, after proper scaling, may be averaged, as at 66, to provide a more precise measure of craft roll rate on output lead 67. These signals may be supplied to for example, the aircraft stability augmentation system for short term aircraft stabilization purposes. The redundant measure of craft roll rate on leads 60 and 62 are applied to an operational amplifier 68 such that its output on lead 69 is proportional to the difference between these signals. This difference signal is applied to a filter and difference detector 70 to which is applied a reference bias representing the constant F in equation (5). The filter may be a simple lag or embody digital Kalman techniques depending upon the requirements of the system. Thus, if the difference signal exceeds the threshold value, a warning signal is supplied on lead 71 indicating a malfunction in the gyros A and/or B.

Figure 7:
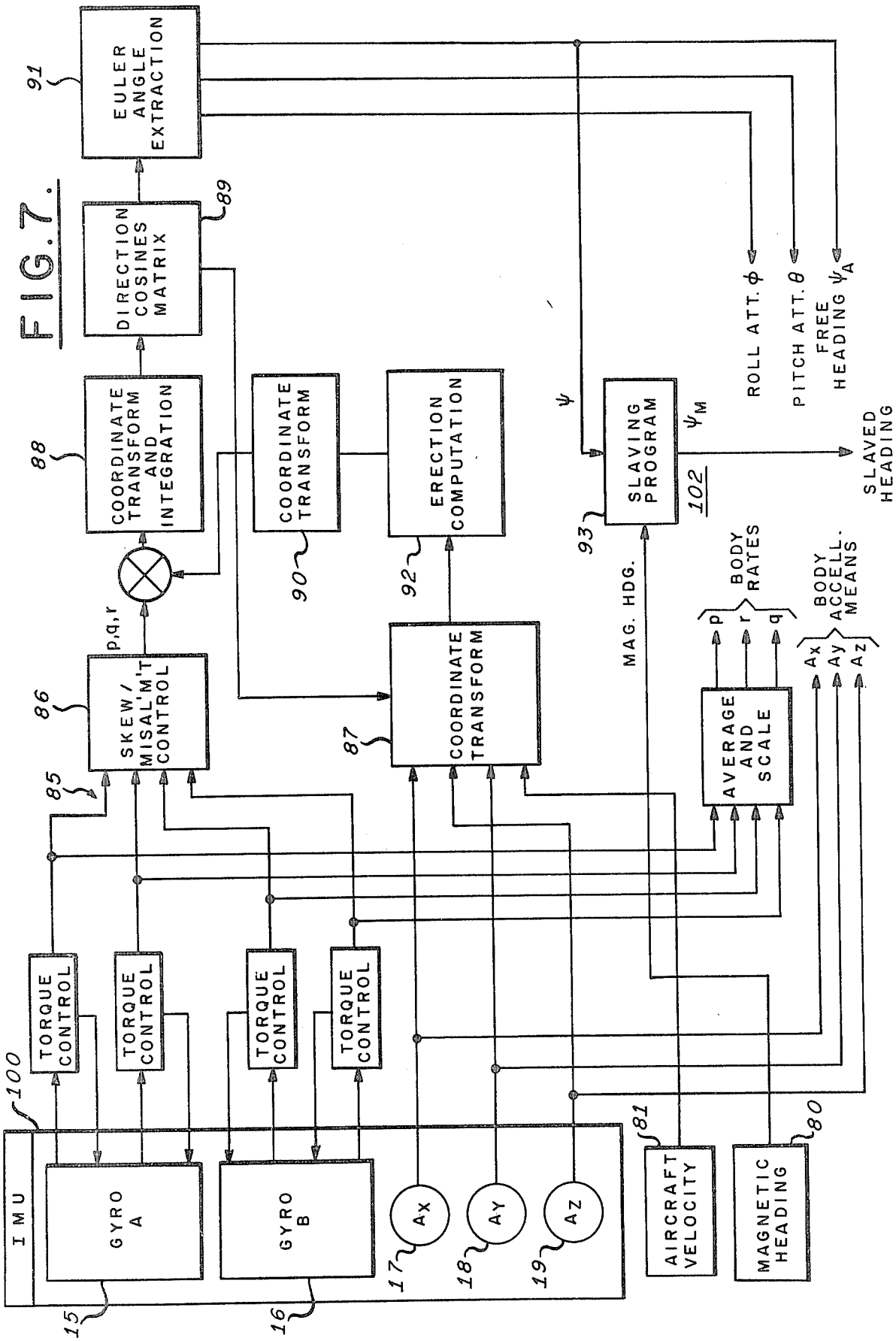
FIG. 7 is a simplified schematic of the over-all strapped down attitude and heading reference system of the present invention.

The IMU of the present invention, as stated, is designed for use in a strapped down attitude and heading reference system and an over-all block diagram of this system is presented in FIG. 7 and consists of the IMU 100 comprising the gyros 15, 16 and accelerometers 17, 18, 19 and the computer section 102, shown in functional block diagram format, together with a magnetic reference input 80 which may comprise a conventional flux valve for providing a gyro stabilized magnetic heading system output; and a craft velocity input 81 which may comprise an air data computer supplying a reference velocity output proportional to the airspeed or a doppler radar for supplying a reference velocity output proportional to aircraft ground speed, the velocity inputs together with the accelerometer outputs being provided for implementing a Schuler tuned or third order erection control for attitude reference system.

It will be recognized that the solution of the erection equations and the solution for the aircraft attitude equations may be performed using digital techniques, such solutions being well understood by those skilled in the strapped down inertial systems art and therefore only a brief description of the overall system of FIG. 7 will be given.

The gyros 15 and 16 are characterized by a very low drift rate, less than 0.25°/hr. which contributes to the achievement of high verticality accuracy and which is insensitive to the aircraft's dynamic maneuvers, thus permitting the use of a third order or Schuler-tuned erection loop using very low gain velocity damping and update correction. Basically, the computational frame is inertial space stabilized so that magnetic heading, magnetic variation and latitude inputs are not required in the erection loops. Thus, the gyro rates measured about the skewed axes shown in FIG. 2 are generated, using the precision pulse width modulation technique or the voltage to frequency converter technique of the above-referenced copending applications, are transmitted to the computer via leads 85. The rate data is converted to aircraft roll, pitch and yaw rate through a skew control and scaling routine 86 which performs the equivalent function of the computations shown in FIG. 6. Any misalignments or non-orthogonality between the gyro reference axes may also be computed in this apparatus from stored constants in the IMU electronic cards 49 (FIG. 1). Vehicle accelerations are measured by the $A_x$, $A_z$, $A_y$ accelerometers and applied to the coordinate transform computer 87. It will be noted that the outputs of the gyros and accelerometers may be used directly as inputs to other aircraft systems. For example, an automatic stability augmentation system (SAS) may use the body axis rate data as its primary inputs while the body axis acceleration may be used for the SAS, automatic flight control system, thrust control system, air data systems, stall warning systems and the like.

The coordinate transformation and integration computer 88 transforms and integrates body rates (pitch, roll and yaw) to obtain a four element quaternion representation of craft attitude and heading. The mathematics of the quaternion have been well documented in the literature and those skilled in the art will recognize the value of this approach. The four element quaternion is converted to direction cosine elements in computer block 89. These direction cosine elements are used in a conventional manner to form the direction cosine matrix in block 87 and the inverse direction cosine matrix in block 90. The Euler angles (pitch roll and yaw or free heading) are computed from the direction cosine elements in block 91. In practice, this computation sequence, skew-misalignment, quaternion computation, direction cosine element computation and Euler angle extraction, must be accomplished many times per second in order to achieve the desired accuracies. In an implementation for an attitude heading reference system, 25 to 100 computations per second would be appropriate.

The erection computation (a conventional damped Schuler mechanization) is accomplished in a horizontal-azimuth stabilized coordinate frame. Thus all input data (vehicle acceleration and velocity) must be transformed into this coordinate frame prior to performing the erection computation. This transformation is accomplished conventionally in block 87. The erection computation block 92 employs a velocity damped Schuler loop similar to those employed for many years. Those experts in the art will recognize this computation as being essentially identical to prior systems which employ gimballed sensors which have been employed in aircraft and ships extensively. The output of the erection computation is a precession or rotation command for the computational frame. This rate or command is summed with the body reaction rate outputs of the skew/misalignment control 86 and integrated in the coordinate transformation and integration computation block 88. Before this summation can be accomplished, the rotation commands must be transformed from an earth axis coordinate frame to the body axis coordinate frame, because the transformation and integration computation can only accept inputs in the body axis frame. Other outputs of the erection computation are horizontal velocity, which may be used in a navigation or flight control system.

The magnetic heading term employed in aircraft today is a blend of inertial heading obtained from a directional gyro and magnetic heading as sensed by an earth's field magnetic sensor or flux valve such as shown, for example, in U.S. Pat. No. 3,691,643 assigned to the present assignee. This slaving program block 93 provides this blending through the use of an algorithm that mechanizes a complementary filter. In this complementary filter, magnetic heading is employed as a long term, low frequency reference and the inertial heading term is used as the high frequency input.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. In a unitary strapped down attitude and heading reference system for an aircraft having first, second and third primary rotation axes and including a system enclosure, said system comprising,
   (a) an inertial reference assembly module including
      (i) a base support member having at least first and second mutually orthogonal reference surfaces and adapted to be fixed within said enclosure with said surfaces disposed in first and second orthogonal planes normal respectively to first and second primary aircraft axes,
      (ii) first and second two-degree-of-freedom rate gyroscopes, each gyroscope having a housing including a rotor and a motor for spinning said rotor about a spin axis and pick-off and torquer means cooperative with said rotor and defining two mutually orthogonal input axes normal to said spin axis and means responsive to said pick-off means for supplying two output signals proportional respectively to aircraft rotation rates about said two input axes,
      (iii) means for aligning and securing said first and second gyroscope housing relative to said first and second base support reference surfaces respectively such that their spin axes are respectively normal thereto and parallel to said first and second aircraft axes and their input axes are respectively skewed at an angle on the order of forty-five degrees relative to the third primary aircraft axis, said gyroscope input axes thereby lying parallel to the slant height of a cone having a half angle on the order of forty-five degrees, the axis of said cone being parallel to said third aircraft axis, the difference between the output signals of the first of said gyroscopes corresponding to components of aircraft rotation rates about one of said first and second axes and the difference between the output signals of said second of said gyroscopes corresponding to components of aircraft rotation rates about the other of said first and second axes, and the output signal components of both gyroscopes corresponding to aircraft rotation rates about said third axis, said last-mentioned signal components being normally equal,
   (b) computer means responsive to said output signals of said inertial reference assembly module including
      (i) means responsive to the signal outputs of said first gyroscope for providing a signal corresponding to the difference therebetween and scaling means for modifying the amplitude thereof in accordance with said skew angle whereby to provide a resultant signal proportional to aircraft rotation rate about said first aircraft axis,
      (ii) means responsive to the signal outputs of said second gyroscope for providing a signal corresponding to the difference therebetween and scaling means responsive to said difference signal for modifying the amplitude thereof in accordance with said skew angle whereby to provide a resultant signal proportional to aircraft rotation rate about said second aircraft axis, and
      (iii) means responsive to the signal outputs of said first and second gyroscopes respectively for providing first and second signals corresponding respectively to the sum thereof and scaling means responsive to each of said sum signals for modifying the amplitudes thereof in accordance with said skew angle whereby to provide two resultant signals proportional to aircraft rotation rates about said third aircraft axis, and means for averaging the values of said two resultant signals.

2. The system as set forth in claim 1 wherein said first, second, and third aircraft axes correspond to the aircraft pitch, yaw and roll axes respectively.

3. The system as set forth in claim 1 wherein said first, second, and third aircraft axes correspond to the aircraft pitch roll and yaw axes respectively.

4. The system as set forth in claim 1 wherein said first, second, and third aircraft axes correspond to the aircraft roll, yaw and pitch axes, respectively.

5. The system as set forth in claim 1 further including
   (a) means responsive to said two sum signals for providing a further signal proportional to the difference therebetween, and
   (b) monitoring means including filtering means responsive to said difference signal for providing a malfunction signal when the value thereof exceeds a predetermined value.

6. The inertial reference assembly as set forth in claim 1 further including:
   an electronics module connected with each of said gyroscopes, each electronics module including means for defining the calibration characteristics unique to its respective gyroscope, said electronics module and gyroscope constituting a removable and replaceable integral subassembly, and
   wire harness and connector means on said base member for connecting each said subassembly with said computer means, whereby said gyroscopes may be removed and replaced without recalibration of the entire inertial reference assembly module.

* * * * *